(12) United States Patent
Davydov et al.

(10) Patent No.: US 11,285,417 B1
(45) Date of Patent: Mar. 29, 2022

(54) APPARATUS AND PROCESS FOR CAPTURING PRODUCT GASES FROM CATALYST STRIPPER

(71) Applicant: UOP LLC, Des Plaines, IL (US)

(72) Inventors: Lev Davydov, Northbrook, IL (US); Robert Mehlberg, Whetaon, IL (US); Matthew R. Wojtowicz, Carpentersville, IL (US); Michael A. Stine, Lake Zurich, IL (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 17/033,712

(22) Filed: Sep. 26, 2020

(51) Int. Cl.
  *B01D 45/12* (2006.01)
  *B04C 3/00* (2006.01)

(52) U.S. Cl.
  CPC ............... *B01D 45/12* (2013.01); *B04C 3/00* (2013.01); *B04C 2003/003* (2013.01)

(58) Field of Classification Search
  CPC ...... B01D 45/12; B04C 3/00; B04C 2003/003; C10G 11/18; B01J 2208/00548; B01J 2208/00557; B01J 2208/00752; B01J 8/0055; B01J 8/0065
  See application file for complete search history.

(56) References Cited

U.S. PATENT DOCUMENTS

| | | | |
|---|---|---|---|
| 2,698,281 A | * | 12/1954 | Leffer ................ B01J 8/26 208/147 |
| 7,247,233 B1 | | 7/2007 | Hedrick |
| 7,799,286 B2 | | 9/2010 | Mehlberg |

\* cited by examiner

*Primary Examiner* — Dung H Bui
(74) *Attorney, Agent, or Firm* — Paschall & Associates, LLC; James C. Paschall

(57) ABSTRACT

In an FCC apparatus and process gas and catalyst exit from a riser, are disengaged from each other and the catalyst is stripped. Product gases are evacuated from catalyst that can over crack the product gases to other undesired products. A baffle in or above the stripping section can direct product gases into a passage that evacuates the product gases to product recovery in isolation from the catalyst.

10 Claims, 3 Drawing Sheets

APPARATUS AND PROCESS FOR CAPTURING PRODUCT GASES FROM CATALYST STRIPPER

FIELD

The field is processes and apparatuses for the fluidized contacting of catalyst with hydrocarbons. More specifically, the field is processes and apparatuses for stripping product gases from catalyst particles.

BACKGROUND

Fluid catalytic cracking (FCC) is a process that contacts hydrocarbons in a reaction zone with a catalyst composed of finely divided particulate material to crack larger hydrocarbon molecules to smaller hydrocarbon molecules. The hydrocarbon feed and fluidizing gases, such as steam, fluidize the catalyst and typically transport it in a riser as the catalyst promotes the cracking reaction. As the cracking reaction proceeds, substantial amounts of hydrocarbon, called coke, are deposited on the catalyst. A high temperature regeneration within a regeneration vessel burns coke from the catalyst by contact with an oxygen-containing stream that also serves as a fluidization medium. Coke-containing catalyst, referred to herein as spent catalyst, is continually removed from the reaction zone and replaced by coke-free or reduced coke catalyst from the regeneration zone. Fluidization of the catalyst particles by various gaseous streams allows the transport of catalyst between the reaction zone and regeneration zone.

In the FCC process, gaseous product is disengaged from particulate catalyst solids as they are discharged from a reactor riser together. The most common method of disengaging catalyst particles from product gases stream uses centripetal separation in a disengagement vessel. Centripetal separators operate by imparting a tangential velocity to gases containing entrained solid particles that forces the heavier solids particles outwardly away from the lighter gases for upward withdrawal of gases and downward collection of solids. Other types of disengaging techniques are also used. The initial stage of separation is typically followed by a second more compete separation of solids from gases in cyclones.

A majority of the hydrocarbon gaseous product that contact the catalyst in the reaction zone are separated from the solid particles by the aforementioned centripetal separation. However, the catalyst particles employed in an FCC process have a large surface area, which is due to a great multitude of pores located on the particles. As a result, the catalytic materials retain hydrocarbons within their pores, upon the surface of the catalyst, and in the spaces between individual catalyst particles as they enter the stripping zone. Although the quantity of hydrocarbons retained on each individual catalyst particle is very small, the large amount of catalyst and the high catalyst circulation rate which is typically used in a modern FCC process results in a significant quantity of hydrocarbons being withdrawn from the reaction zone with the catalyst.

It is common practice to remove, or strip, hydrocarbons from spent catalyst prior to passing the catalyst into the regeneration zone. The most common method of stripping the catalyst passes a stripping gas, usually steam, through a flowing stream of catalyst, counter-currently to its direction of flow. Such steam stripping operations, with varying degrees of efficiency, remove the hydrocarbon vapors which are entrained with the catalyst and adsorbed on the catalyst.

The efficiency of catalyst stripping is increased by using stripping internals which may comprise vertically spaced baffles or patterned strips to cascade the catalyst from side to side as it moves down a stripping apparatus and counter-currently contacts a stripping medium. The stripping medium enters from below the lower internals and continues rising upwardly through the internals. As the catalyst progresses down the stripper counter-currently to the stripping medium, both displacement of interstitial hydrocarbons and desorption of heavy hydrocarbon products take place.

Catalyst discharged from a disengaging exit of a riser to separate the spent catalyst may travel in a motion that catalyst can potentially cause erosion of internal equipment and flow maldistribution in the stripping section. Consequently, refiners have resorted to operating the dense catalyst bed with a designed height above the stripping internals to buffer the stripping internals from erosion by the moving catalyst.

BRIEF SUMMARY

The presence of gaseous products in the stripper causes the partial pressure of hydrocarbon to increase. Additionally, higher depth of the dense catalyst bed above the stripper provides an environment in which concentrated hydrocarbons meet with a dense phase of catalyst. We have found that this presents an opportunity for over cracking of hydrocarbon products to undesired by-products. We have discovered a process and apparatus of evacuating stripped gaseous hydrocarbons out of the stripping section, so as to minimize contact with catalyst and preserve the product gases against over cracking. A passage with an inlet end in communication with the stripping section may be used to evacuate product gases to product recovery. An outlet end of the passage may be near a disengaging outlet of a riser. A baffle may be interposed on the periphery of the stripping section for directing stripped gaseous products to the passage. Stripped gaseous products may be passed through the passage through a chamber containing catalyst to avoid contact with the catalyst.

Additional details and embodiments of the invention will become apparent from the following detailed description of the invention.

DESCRIPTION OF THE INVENTION

Figure 4:
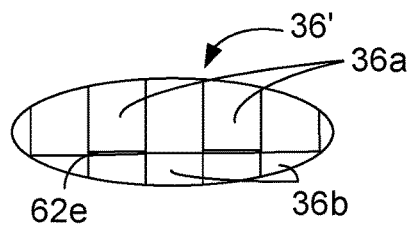
FIG. 4 is a partial plan schematic of FIG. 3.

Catalyst disengaged from gaseous product on discharge from a riser can continue in erosive fluid pathways when encountering the stripping internals. For example, disengaging devices that use tangential or swirl arms to effect primary separation of catalyst and gaseous products discharged from a FCC riser reactor impart substantial tangential momentum to catalyst particles. As the stream of spent catalyst descends a disengaging chamber, the swirling catalyst generates a rotating catalyst bed that can erode the top layers of stripping internals. Increasing the depth of the dense catalyst bed above the stripping internals can shield the stripping internals from erosion.

We have also observed in commercial operation that greater residence time in the dense catalyst bed above the stripping section due to the increased bed depth results in greater yield of undesired byproducts at the expense of desired liquid products. This may result from cracking reactions continuing to occur while the product gases are in contact with catalyst. Reducing the depth of the dense catalyst bed to reduce product vapor residence time would be advantageous. However, doing so requires exposing the upper layers of the stripping internals to the erosive movement of the catalyst particles.

We have found that the hydrocarbon partial pressure increases in the stripper section which, when exposed to the dense bed of catalyst over prolonged residence time, provides an unfortunately optimum condition for continued unselective over cracking to undesired by-products. We propose to inhibit the conditions that lead to over cracking by evacuating hydrocarbons from the dense bed of catalyst thereby minimizing vapor residence time and hydrocarbon partial pressure. The hydrocarbons are removed from a vessel or chamber containing large amounts of catalyst through a passage that isolates the hydrocarbon gases from catalyst in the vessel or chamber.

The apparatus or process may be conducted in a fluid catalytic cracking (FCC) operation in which catalyst particles and gaseous products must be separated. The typical feed to an FCC unit is a gas oil such as a vacuum gas oil or atmospheric residue.

As used herein, the term "boiling point temperature" means atmospheric equivalent boiling point (AEBP) as calculated from the observed boiling temperature and the distillation pressure, as calculated using the equations furnished in ASTM D1160 appendix A7 entitled "Practice for Converting Observed Vapor Temperatures to Atmospheric Equivalent Temperatures". As used herein, the term "True Boiling Point" (TBP) means a test method for determining the boiling point of a material which corresponds to ASTM D-2892 for the production of a liquefied gas, distillate fractions, and residuum of standardized quality on which analytical data can be obtained, and the determination of yields of the above fractions by both mass and volume from which a graph of temperature versus mass % distilled is produced using fifteen theoretical plates in a column with a 5:1 reflux ratio. As used herein, the term "T5" or "T95" means the temperature at which 5 mass percent or 95 mass percent, as the case may be, respectively, of the sample boils using ASTM D-86 or TBP. As used herein, the term "initial boiling point" (IBP) means the temperature at which the sample begins to boil using ASTM D-7169, ASTM D-86 or TBP, as the case may be. As used herein, the term "end point" (EP) means the temperature at which the sample has all boiled off using ASTM D-7169, ASTM D-86 or TBP, as the case may be. As used herein, "vacuum gas oil" means a hydrocarbon material having an IBP of at least about 232° C. (450° F.), a T5 of between about 288° C. (550° F.) and about 392° C. (700° F.), typically no more than about 343° C. (650° F.), a T95 between about 510° C. (950° F.) and about 570° C. (1058° F.) and, or an EP of no more than about 626° C. (1158° F.) prepared by vacuum fractionation of atmospheric residue as determined by any standard gas chromatographic simulated distillation method such as ASTM D2887, D6352 or D7169, all of which are used by the petroleum industry. As used herein, "atmospheric residue" means a hydrocarbon material having an IBP of at least about 232° C. (450° F.), a T5 of between about 288° C. (550° F.) and about 392° C. (700° F.), typically no more than about 343° C. (650° F.), and a T95 between about 510° C. (950° F.) and about 700° C. (1292° F.) obtained from the bottoms of an atmospheric crude distillation column.

The reaction zone of an FCC process is maintained at high temperature conditions which may generally include a temperature above about 425° C. (797° F.). In an embodiment, the reaction zone is maintained at cracking conditions which include a temperature of from about 480° C. (896° F.) to about 590° C. (1094° F.) and a pressure of from about 69 kPa (g) (10 psig) to about 517 kPa (g) (75 psig) but typically less than about 275 kPa (g) (40 psig). The catalyst-to-oil ratio, based on the weight of catalyst and feed hydrocarbons entering the bottom of the riser, may range up to 20:1 but is typically between about 4:1 and about 10:1. Hydrogen is not normally added to the riser generating an absence of substantial added hydrogen in the reactor. Steam is typically passed into the riser to effect catalyst fluidization and feed dispersion. The average residence time of catalyst in the riser may be less than about 5 seconds. The type of catalyst employed in the process may be chosen from a variety of commercially available catalysts. A catalyst comprising a Y-type zeolite base material is preferred, but the older style amorphous catalyst may be used if desired. MFI zeolite may be added to the catalyst mixture.

The catalyst regenerator is preferably operated at a pressure of from about 69 kPa (g) (10 psig) to about 552 kPa (g) (80 psig). The spent catalyst being charged to the regenerator may contain from about 0.2 to about 5 wt-% coke. This coke is predominantly comprised of carbon and can contain from about 3 to about 12 wt-% hydrogen, as well as sulfur and other elements. The oxidation of coke will produce the common combustion products: water, carbon oxides, sulfur oxides and nitrous oxides. The regenerator may take several configurations, with regeneration being performed in one or more stages.

Figure 1:
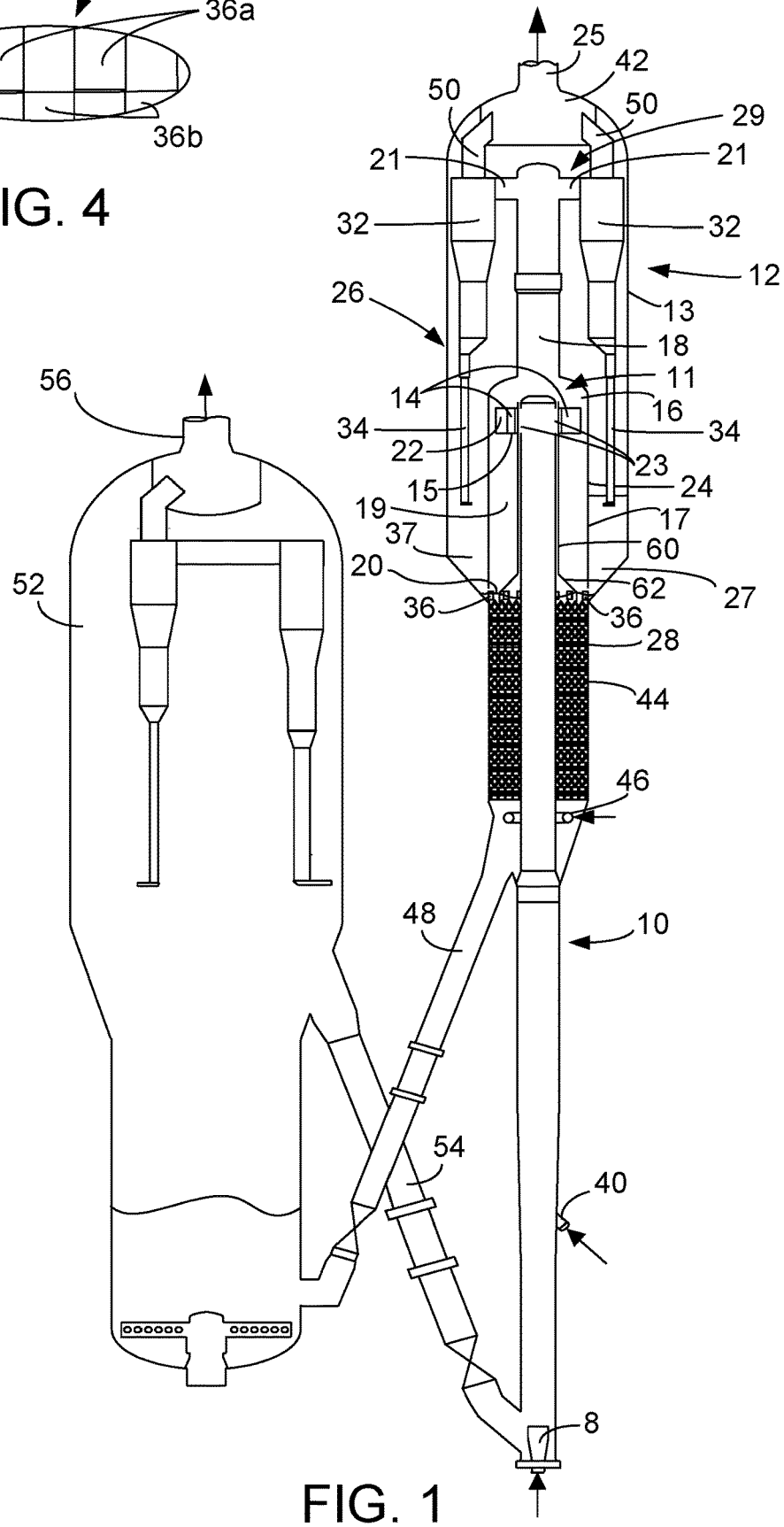
FIG. 1 is a schematic cross-sectional view of an FCC unit.

FIG. 1 is the schematic illustration of an FCC unit. The FCC unit includes an elongated riser or reactor riser 10. A stream of hot catalyst particles is delivered to a lower section of the riser 10 from a regenerator conduit 54 at which a fluidizing gas from a distributor 8 pneumatically conveys the catalyst particles upwardly through the riser 10. As the mixture of catalyst and conveying gas continues up the riser 10, a nozzle 40 injects hydrocarbon feed stream perhaps including steam into the steam of catalyst particles. The contact with hot catalyst particles vaporizes the hydrocarbons and further conveys the mixture of gas and catalyst through the riser 10 while cracking the hydrocarbons to desirable lower-boiling, gaseous products.

The riser 10 extends upwardly into a reactor vessel 12. The riser 10 preferably has a vertical orientation within the reactor vessel 12 and may extend upwardly through a bottom of the reactor vessel 12. The reactor vessel comprises an outer wall 13. The catalyst particles and gaseous products are then discharged from a disengaging end 11 of the reactor riser 10. The catalyst particles are disengaged from the cracked gaseous products upon exiting disengaging end 11 of the riser 10. The catalyst particles are covered with substantial quantities of coke and generally referred to as "spent catalyst."

A disengaging device 26 may be provided at the disengaging end 11 of the reactor riser 10 to disengage spent catalyst from cracked gaseous products. A swirl arm arrangement is an example of a disengaging device 26 that may be provided at the disengaging end 11 of the reactor riser 10 for primary disengagement of catalyst particles from cracked gaseous products. The swirl arm arrangement includes a curved tubular duct 14 in downstream communication with a corresponding riser outlet 23 in a wall of the riser 10. A plurality of tubular ducts 14 may be utilized in the disengaging device 26. The disengaging device 26 may be located in a disengaging chamber 16.

The term "communication" means that fluid flow is operatively permitted between enumerated components. The term "downstream communication" means that at least a portion of fluid flowing to the subject in downstream communication may operatively flow from the object with which it fluidly communicates.

The stream of catalyst particles and gaseous products exits the riser 10 through the riser outlet 23 and enter into the tubular duct 14. The curved configuration of the tubular duct 14 induces the solid catalyst particles and gaseous products to swirl in an angular direction upon exit from a disengaging outlet 22 at the end of the tubular duct opposite the riser outlet 23. The disengaging outlet 22 is configured to disengage the solid catalyst particles from the gaseous products facilitated by the configuration of the tubular duct 14. The curved tubular duct 14 imparts a tangential angular velocity to the exiting mixture of catalyst particles and cracked gaseous products as they are discharged from a disengaging outlet 22 at the end of the tubular duct. The mixture exits the disengaging outlet into a disengaging section 19 of the disengaging chamber 16. The tangential angular velocity establishes centripetal forces that cause the denser catalyst particles to gravitate to an outer shell 17 of the disengaging chamber 16 while lighter gaseous products ascend away from the catalyst effecting disengagement. The disengaging device 26 may be located in the disengaging section 19 in an upper region of a disengaging chamber 16. The swirl arm arrangement 15 may comprise a plurality of tubular ducts 14 with a corresponding number of disengaging outlets 22. The disengaging chamber 16 is in downstream communication with the disengaging outlet 22.

A stripping section 28 may be located in the disengaging chamber 16 below the discharge outlet 26. Catalyst separated by the swirl arm arrangement 26 drops down into the stripping section 28. The ascending, disengaged gaseous products, comprising cracked hydrocarbons and entrained spent catalyst particles, exit the disengaging chamber 16 via a gas recovery conduit 18. The gas recovery conduit 18 branches into ducts 21 that supply respective cyclones 32. Hence, a channel 29 runs from the disengaging chamber 16 to each cyclone 32. The cyclones 32 are in downstream communication with the disengaging outlet 22 via the gas recovery conduit 18. The cyclones 32 further separate entrained catalyst particles from gaseous products. The cyclones 32 create a tangential swirling motion therein to establish centripetal forces that further separate solids from gases. A product gas stream, essentially free of catalyst particles, exits the cyclones 32 through vapor outlet pipes 50 into a plenum chamber 42. The product gas stream then exits the reactor vessel 12 through an outlet 25. Catalyst solids recovered by the cyclones 32 exit the bottom of the cyclone through diplegs 34. The diplegs 34 extend downwardly in the reactor vessel 12 outside of the disengaging chamber 16 in a reactor annulus 37. The diplegs 34 may terminate at a flapper valve which prevents gas from entering the dipleg 34 but allows catalyst particles to exit the dipleg 34 into a dense bed 20 at a bottom of the reactor vessel 12 in the reactor annulus 37 surrounding the disengaging chamber 16.

Catalyst particles in the reactor vessel 12 are admitted by windows 36 in the wall 17 into the disengaging chamber 16. The windows 36 between the reactor vessel 12 and the disengaging chamber 16 allow catalyst to flow from the reactor annulus 37 into the disengaging chamber 16. Stripping gas such as steam may be injected into the catalyst entering through the windows from the annulus 37 into the disengaging chamber 16 to pre-strip the spent catalyst before it enters the disengaging chamber 16. The disengaging chamber 16 is in downstream communication with the reactor vessel 12 and/or the cyclones 32 therein through the windows 36 due to head pressure. Catalyst particles in the dense catalyst bed 20 enter the stripping section 28 located in the disengaging chamber 16. Catalyst particles pass downwardly through and/or over stripping internals 44 which may comprise a plurality of elongated metal strips arranged together in a pattern in the stripping section 28. The strips may have straight portions set at angles to other strips or other straight portions of the same strip. Layers or arrays of strips may be stacked in the stripping section. The metal strips may define a structural packing or may define gratings with or without down corners. Examples of suitable structural packing may be found in US 2005/0205467 and suitable gratings may be found in U.S. Pat. No. 6,680,030 for use in stripping vessels.

A stripping fluid, typically steam, enters a lower portion of the stripping section 28 through at least one distributor 46. Counter-current contact of the catalyst with the stripping fluid over the stripping internals 44 displaces product gases adsorbed on the catalyst as it continues downwardly through the stripping section 28. Stripped catalyst from the stripping section 28 may pass through a spent catalyst conduit 48 to a catalyst regenerator 52. In the regenerator, coke deposits are combusted from the surface of the catalyst by contact with an oxygen-containing gas at high temperature. Following regeneration, regenerated catalyst particles are delivered back to the bottom of the riser 10 through the regenerator conduit 54. Flue gas exits the regenerator 52 through a flue nozzle 56.

The dense catalyst bed 20 has an upper interface that is above the top of the stripping internals 44 to protect them from the erosive movement of catalyst. We have found that hydrocarbon partial pressure can build up in the stripping section 28 providing conditions that promote over cracking of gaseous products to undesired products. We propose a process and apparatus that evacuates the hydrocarbon gaseous product from the stripping section 28 to minimize vapor residence time and avoid the build-up of the hydrocarbon partial pressure. Evacuation is achieved by passing stripped gaseous products through a chamber, such as the disengaging chamber 16, that contains catalyst through a passage 60. A baffle 62 may direct stripped gaseous product into the passage 60 for evacuation through the chamber.

Figure 2:
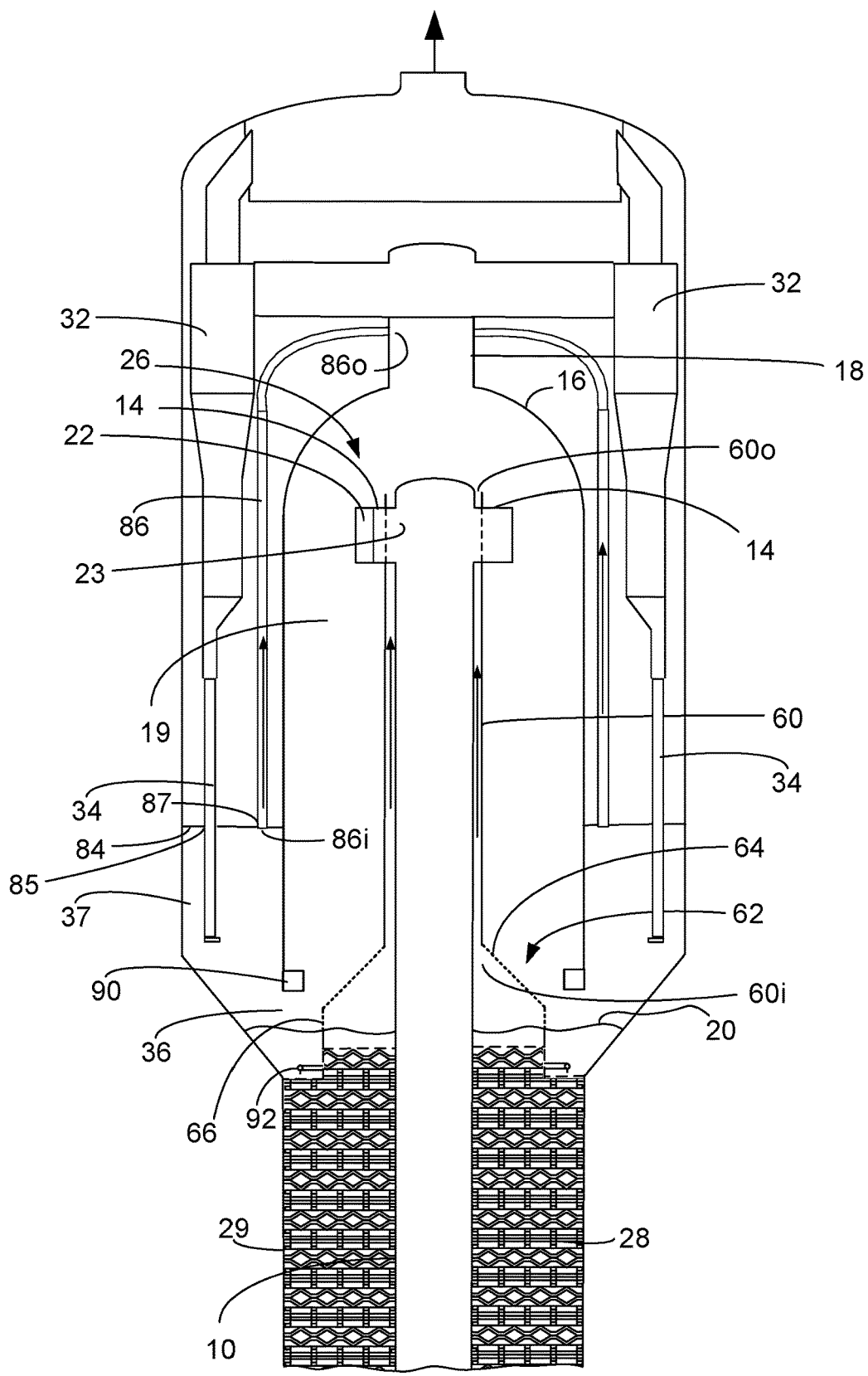
FIG. 2 is an enlarged partial view of a portion of FIG. 1.

The process and apparatus are further illustrated with reference to FIG. 2 which is an enlarged partial version of the embodiment of FIG. 1. Elements in FIG. 2 with the same configuration as in FIG. 1 will have the same reference numeral as in FIG. 1. The configuration and operation of the embodiment of FIG. 2 is essentially the same as in FIG. 1.

In one embodiment, the passage 60 passes through the disengagement chamber 16. The passage 60 is shown in FIG. 2. Arrows in the passage 60 indicate the direction of vapor travel. The passage 60 has an inlet end 60*i* in downstream communication with the stripping section 28. The inlet end 60*i* may comprise a baffle 62. The baffle 62 may be interposed between a disengaging section 19 of the disengaging chamber 16 and the stripping section 28. The baffle 62 directs stripped gaseous products from the stripping section 28 into the inlet end 60*i* of the passage 60. The baffle directs stripped gaseous products away from the disengaging section 19 and/or the reactor annulus 37. The passage 60 may pass stripped gaseous products through the passage near or next to the riser 10. In an embodiment, the passage 60 may comprise an annulus around and/or concentric with the riser 10.

The passage may have an outlet end 60o near the outlet 23 of the riser 10. Tubular ducts 14 of the disengaging device 26 may protrude through the passage 60. The outlet 60o may be located just above the tubular ducts 14 and the disengaging outlet 22. The outlet 60o of the passage 60 may discharge stripped gaseous products from the passage 60 near the outlet 23 of the riser 10 and/or the disengaging outlet 22 of the tubular duct 14. Preferably, the outlet 60o is located above the outlet 23 of the riser 10 and/or the disengaging outlet 22 of the tubular duct 14, so the gaseous products emitted do not contact the spent catalyst discharged from the riser 10 but ascend with the other gaseous products disengaged from the spent catalyst up the gas recovery conduit 18. The passage 60 isolates the gaseous products from the catalyst in the chamber, in this embodiment, the disengaging chamber 16, through which the passage 60 travels to prevent further engagement between the catalyst and product gases which can lead to over cracking.

The baffle 62 may be interposed on the periphery of the stripping section 28. The baffle 62 may comprise a frustoconical wall 64. The frustoconical wall 64 may include perforations. The perforations may be sized sufficiently large to admit catalyst particles therethrough. The frustoconical wall may be located in the disengaging section 19 above the stripping section 28. The disengaged spent catalyst discharged from the riser 10 will descend and continuously accumulate on the top of the frustoconical wall 64 to discourage stripped product gases from ascending through the perforations while admitting catalyst through the perforations into the stripping section 28. The perforations provide one-way flow of the catalyst downwardly through the frustoconical wall 64 during operation.

The baffle 62 may include a vertical wall 66 depending from a bottom edge of the frustoconical wall 64. The vertical wall 66 may comprise a cylinder. The upper region of the vertical wall 66 may be imperforate to prevent gaseous products from escaping entry into the passage 60. However, the lower region of the vertical wall 66 below the top of the catalyst bed 20 may have perforations sized to admit spent catalyst descending either from the annulus 37 or from the disengaging section 19 accumulating in the dense bed 20 into the stripping section 28. The dense bed 20 of catalyst and the imperforate upper region of the vertical wall 66 above the dense bed will direct stripped gaseous products away from entering the disengaging section 19 from the stripping section 28. The pressure differential should be operated to assure that fluid flow through the baffle 62 is only into stripping section 28 and not into the disengaging section 19 from the stripping section.

A flow interrupter 90 may be installed above the windows 36 to dampen any swirling currents imparted by the disengaging device 26. Flow interrupters 90 may be located above windows 36 to disrupt any patterns that may develop in the disengaging chamber 16.

A pre-stripping ring 92 for stripping catalyst entering the stripping section 28 with stripping gas may be located in the stripping section 28 adjacent to the windows 36. Optionally, the pre-stripping ring 92 may be located in the reactor annulus 37 adjacent the windows 36.

A barrier 84 which may be annular is disposed in the annulus 37 above the dense catalyst bed 20 and above the windows 36 to prevent gaseous product from rising in the annulus into the large free volume section of the reactor 12. Apertures 85 in the barrier 84 permit dip legs 34 to protrude through the barrier for dispensing catalyst into the dense catalyst bed 20 below the barrier in the annulus 37. Dome steam may be distributed above the barrier 84 to ensure that no gaseous product travels from below the barrier 84 through gaps between the dip legs 34 and the apertures 85 into the large open volume in the reactor 12. Due to the higher pressure of the dome steam, all gas travel will be one-way down through apertures 85 instead of upwardly in the reverse.

A second embodiment of passage of the present disclosure is provided by a product tube 86 that passes through the reactor annulus 37 which contains catalyst. The product tube 86 has an inlet end 86i at an opening 87 in the barrier in downstream communication with the annulus 37 below the barrier 84. The product tube 86 transports gaseous product that makes its way into the annulus 37 into the gas recovery conduit 18 comprising the channel 21 from the disengaging vessel 16 to the cyclones 32. The product tube 86 provides a passage that passes gaseous product through the reactor vessel 12 in isolation from the catalyst in the reactor vessel. The product tube 86 has an inlet end 86i in downstream communication with the stripping section 28 and an outlet end 86o near the disengaging outlet 22. The outlet end 86o may discharge gaseous product into the channel 21 comprising the gas recovery conduit 18 for distribution into the cyclones 32. The first and the second embodiments of the passage 60 and 86 may be provided together or separately according to the disclosure.

The process and apparatus are further illustrated with reference to FIG. 3 which is an alternative of the embodiment of FIG. 2. Elements in FIG. 3 with the same configuration as in FIG. 2 will have the same reference numeral as in FIG. 2. Elements in FIG. 3 which have a different configuration as the corresponding element in FIG. 2 will have the same reference numeral but designated with a prime symbol ('). The configuration and operation of the embodiment of FIG. 2 is essentially the same as in FIG. 3, with the following exceptions.

Figure 3:
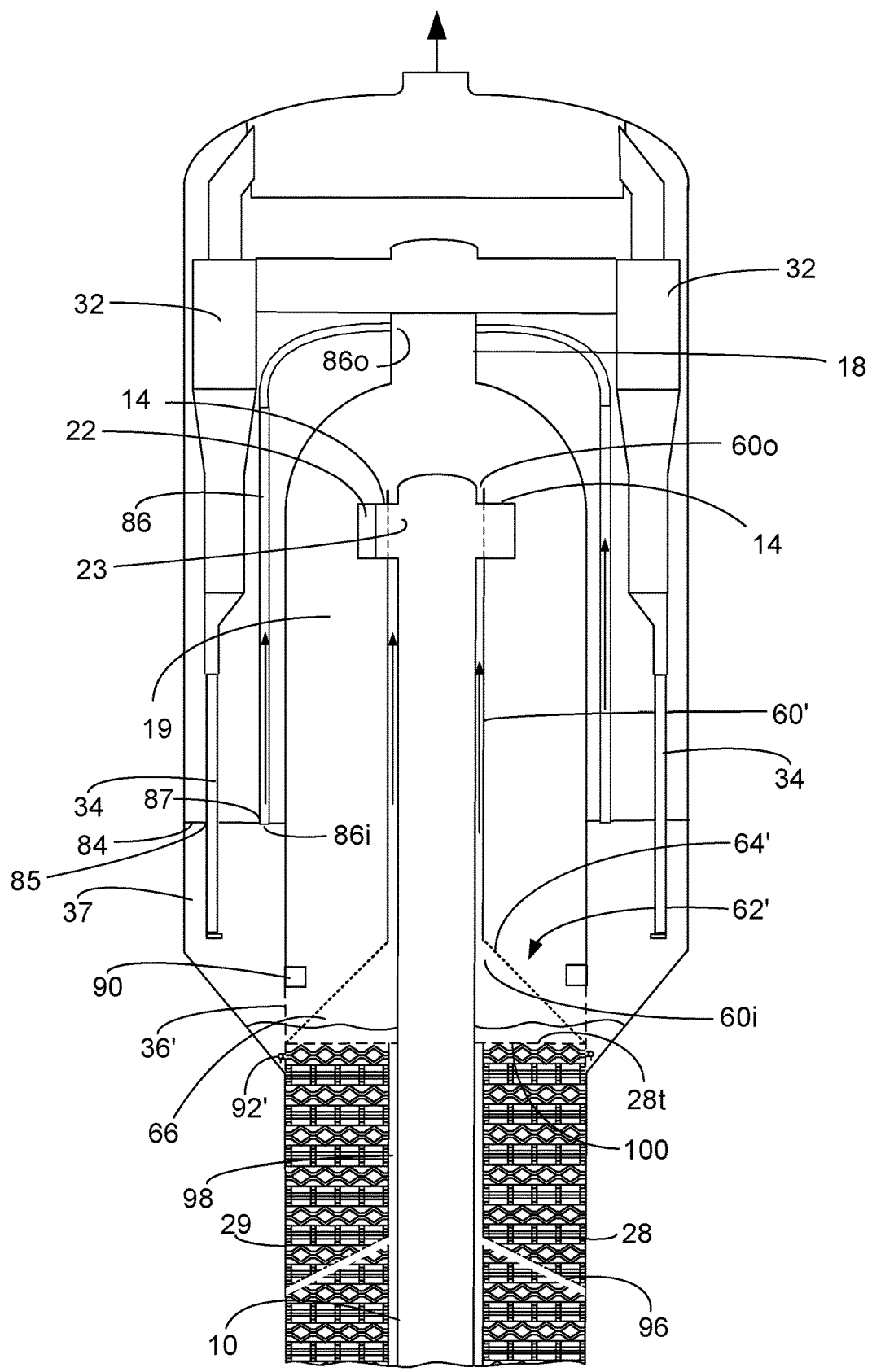
FIG. 3 is an alternative embodiment to FIG. 2.

In FIG. 3, the frustoconical wall 64' of the baffle 62' extends all the way to the wall 17 of the disengaging chamber 16 thereby omitting the vertical wall of the baffle 62' of FIG. 2. The windows 36' comprise perforations which admit catalyst from the disengaging chamber 16 into the annulus 37 and from the annulus into the stripping section 28. The pre-stripping ring 92' for stripping catalyst entering the stripping section with stripping gas is in the annulus 37 adjacent to the windows 36.

The windows may have a tessellated configuration as shown in FIG. 4 which is a partial plan view looking inwardly from the annulus 37. Exits 36a admit catalyst from the disengaging section 19 of the disengaging chamber 16 into the annulus 37. Inlets 36b admit catalyst from the reactor annulus 37 into the stripping section 28. A lower edge 62e of the baffle 62 is also visible from the view in FIG. 4. Catalyst flow and pressure differential can be coordinated to prevent product gases from flowing against the flow of the catalyst through exits 36a and inlets 36b. Gaseous products typically only flow into the passage 60 through the inlet 60i.

FIG. 3 also depicts a baffle 96 comprising a conical wall in the stripping section 28 which may direct product gases to a passage 98 that communicates with the passage extending through the disengaging section. The passage 98 is similarly annular as the passage 60' around the riser 10. The baffle 96 may be perforated like the baffle 62' to admit catalyst downwardly but prevent ascension of gaseous products upwardly through perforations unless through the passage 98. The baffle 96 directs stripped gaseous products from an intermediate level below a top 28*t* of the stripping section 28 to the passage 98. The passage 98 may be considered part of the passage 60'. A grating 100 may be fastened on top of the stripping internals 44 to hold them in place.

The process and apparatus permits operating the FCC unit at a higher bed level to prevent potential erosion of stripping internals 44 while avoiding the prospect of over cracking. Testing has shown yield benefits of the evacuation of gaseous product lowers coke production by 15 wt % relative to conventional operation in a commercial unit.

SPECIFIC EMBODIMENTS

While the following is described in conjunction with specific embodiments, it will be understood that this description is intended to illustrate and not limit the scope of the preceding description and the appended claims.

A first embodiment of the disclosure is a process for separating catalyst particles from a gaseous product stream comprising contacting a hydrocarbon feed stream with catalyst particles in an elongated riser to produce gaseous products; disengaging the catalyst particles from the gaseous products upon exiting the riser; stripping gaseous products from the catalyst particles; passing gaseous products through a chamber containing catalyst through a passage. An embodiment of the disclosure is one, any or all of prior embodiments in this paragraph up through the first embodiment in this paragraph further comprising directing gaseous products from a stripping section to the passage. An embodiment of the disclosure is one, any or all of prior embodiments in this paragraph up through the first embodiment in this paragraph further comprising discharging gaseous products from the passage near the outlet of the riser. An embodiment of the disclosure is one, any or all of prior embodiments in this paragraph up through the first embodiment in this paragraph further comprising passing gaseous products through the passage next to the riser. An embodiment of the disclosure is one, any or all of prior embodiments in this paragraph up through the first embodiment in this paragraph further comprising directing disengaged gaseous products to a cyclone to further separate entrained catalyst particles from the disengaged gaseous products, discharging separated catalyst particles from the cyclone into a reactor annulus, passing separated catalyst particles from the reactor annulus into a stripping section in which the gaseous products are stripped from the catalyst particles. An embodiment of the disclosure is one, any or all of prior embodiments in this paragraph up through the first embodiment in this paragraph further comprising directing gaseous products from the reactor annulus through the passage to an outlet above the riser outlet. An embodiment of the disclosure is one, any or all of prior embodiments in this paragraph up through the first embodiment in this paragraph further comprising directing stripped gaseous products from an intermediate level below a top of the stripping section to the passage.

A second embodiment of the disclosure is an apparatus for separating catalyst particles from gaseous products comprising an elongated riser in which a hydrocarbon feed is contacted with catalyst particles to produce gaseous products, the riser including a disengaging outlet configured to disengage the solid catalyst particles from gaseous products; a chamber communicating with the disengaging outlet of the riser, the chamber including an outer shell, a stripping section comprising stripping internals; a passage with an inlet end in communication with the stripping section and a baffle for directing stripped gaseous products to the passage. An embodiment of the disclosure is one, any or all of prior embodiments in this paragraph up through the second embodiment in this paragraph wherein the passage has an outlet end proximate to an outlet of the riser. An embodiment of the disclosure is one, any or all of prior embodiments in this paragraph up through the second embodiment in this paragraph wherein the disengaging end of the riser includes an opening in the riser in communication with a duct and the outlet end is above the duct. An embodiment of the disclosure is one, any or all of prior embodiments in this paragraph up through the second embodiment in this paragraph wherein the baffle comprises a conical wall. An embodiment of the disclosure is one, any or all of prior embodiments in this paragraph up through the second embodiment in this paragraph wherein the conical wall has perforations therein sized to allow catalyst particles through. An embodiment of the disclosure is one, any or all of prior embodiments in this paragraph up through the second embodiment in this paragraph wherein the conical wall is above the stripping section. An embodiment of the disclosure is one, any or all of prior embodiments in this paragraph up through the second embodiment in this paragraph wherein the baffle is in the stripping section. An embodiment of the disclosure is one, any or all of prior embodiments in this paragraph up through the second embodiment in this paragraph wherein the passage comprises an annulus around the riser. An embodiment of the disclosure is one, any or all of prior embodiments in this paragraph up through the second embodiment in this paragraph further comprising a channel from the chamber to a cyclone for further separating entrained catalyst particles from gaseous products; a dip leg of the cyclone in a reactor annulus outside of the chamber for discharging separated catalyst particles into the reactor annulus and the baffle including a vertical wall comprising perforations for admitting separated catalyst particles into the stripping section. An embodiment of the disclosure is one, any or all of prior embodiments in this paragraph up through the second embodiment in this paragraph further comprising a barrier in the reactor annulus through which the dip leg protrudes and the passage comprises a tube with an inlet in the barrier and an outlet in communication with the channel.

A third embodiment of the disclosure is an apparatus for separating catalyst particles from gaseous products comprising an elongated riser in which a hydrocarbon feed is contacted with catalyst particles to produce gaseous products, the riser including a disengaging outlet configured to disengage the solid catalyst particles from gaseous products; a chamber communicating with the disengaging outlet of the riser, the chamber including an outer shell, a stripping section comprising stripping internals; a passage with an inlet end in communication with the stripping section and an outlet end near the disengaging outlet. An embodiment of the disclosure is one, any or all of prior embodiments in this paragraph up through the second embodiment in this paragraph further comprising a baffle above the stripping section and the chamber for directing stripped gaseous products to the passage. An embodiment of the disclosure is one, any or all of prior embodiments in this paragraph up through the third embodiment in this paragraph wherein the baffle comprises a conical wall.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. An apparatus for separating catalyst particles from gaseous products comprising: an elongated riser in which a hydrocarbon feed is contacted with catalyst particles to produce gaseous products, said riser including a disengaging outlet configured to disengage the solid catalyst particles from gaseous products; a chamber communicating with said disengaging outlet of said riser, said chamber including an outer shell, a stripping section comprising stripping internals; a passage with an inlet end in communication with said stripping section and a baffle for directing stripped gaseous products to said passage; wherein the baffle comprises a conical wall, wherein the conical wall has perforations therein sized to allow catalyst particles through.

2. The apparatus of claim 1 wherein said passage has an outlet end proximate to an outlet of said riser.

3. The apparatus of claim 2 wherein said disengaging end of said riser includes an opening in said riser in communication with a duct and said outlet end is above said duct.

4. The apparatus of claim 1 wherein the conical wall is above the stripping section.

5. The apparatus of claim 1 wherein the baffle is in the stripping section.

6. The apparatus of claim 1 further comprising a channel from said chamber to a cyclone for further separating entrained catalyst particles from gaseous products; a dip leg of said cyclone in a reactor annulus outside of said chamber for discharging separated catalyst particles into said reactor annulus and said baffle including a vertical wall comprising perforations for admitting separated catalyst particles into said stripping section.

7. The apparatus of claim 6 further comprising a barrier in said reactor annulus through which said dip leg protrudes and said passage comprises a tube with an inlet in said barrier and an outlet in communication with said channel.

8. An apparatus for separating catalyst particles from gaseous products comprising: an elongated riser in which a hydrocarbon feed is contacted with catalyst particles to produce gaseous products, said riser including a disengaging outlet configured to disengage the solid catalyst particles from gaseous products; a chamber communicating with said disengaging outlet of said riser, said chamber including an outer shell, a stripping section comprising stripping internals; a passage with an inlet end in communication with said stripping section and a baffle for directing stripped gaseous products to said passage an outlet end near said disengaging outlet.

9. An apparatus of claim 8 further comprising a baffle above said stripping section and said chamber for directing stripped gaseous products to said passage.

10. The apparatus of claim 8 wherein the baffle comprises a conical wall.

* * * * *